US008479734B2

(12) United States Patent
Wood

(10) Patent No.: US 8,479,734 B2
(45) Date of Patent: Jul. 9, 2013

(54) OVERPRESSURE PROTECTION SYSTEM AND METHOD FOR A HYPERBARIC CHAMBER

(76) Inventor: John Steven Wood, San Antonio, TX (US)

( * ) Notice: Subject to any disclaimer, the term of this patent is extended or adjusted under 35 U.S.C. 154(b) by 623 days.

(21) Appl. No.: 12/615,665

(22) Filed: Nov. 10, 2009

(65) Prior Publication Data

US 2011/0108032 A1 May 12, 2011

(51) Int. Cl.

| | |
|---|---|
| ***A61G 10/00*** | (2006.01) |
| ***A62B 9/02*** | (2006.01) |
| ***A62B 7/02*** | (2006.01) |
| ***F16K 31/12*** | (2006.01) |

(52) U.S. Cl.
USPC ............ 128/205.26; 128/205.24; 128/202.12; 128/204.29; 137/488; 137/492

(58) Field of Classification Search
USPC 128/205.26, 202.12, 202.22, 205.24; 454/70, 454/71, 72; 137/458, 461, 455, 488, 485, 137/492; 251/129.04
See application file for complete search history.

(56) References Cited

U.S. PATENT DOCUMENTS 3,227,171 A * 1/1966 Woelfel .................... 137/87.04
3,368,556 A 2/1968 Jensen et al.
3,478,769 A 11/1969 Zavod et al.
3,547,118 A 12/1970 Kolman
3,788,341 A * 1/1974 Athy et al. .................... 137/209
4,074,692 A * 2/1978 Shafer .......................... 137/488
4,215,746 A * 8/1980 Hallden et al. .................. 166/53
4,240,463 A * 12/1980 Moore ....................... 137/492.5
4,633,859 A 1/1987 Reneau
5,503,143 A 4/1996 Marion et al.
5,685,293 A * 11/1997 Watt ........................ 128/202.27
6,050,132 A 4/2000 Capria
6,880,567 B2 * 4/2005 Klaver et al. ............. 137/487.5
7,360,539 B2 4/2008 Gurnee et al.
7,621,293 B2 * 11/2009 Snowbarger ............... 137/487.5
2004/0261796 A1 12/2004 Butler
2009/0014004 A1 1/2009 Whalen et al.
2010/0059059 A1 * 3/2010 Evans ...................... 128/205.26

OTHER PUBLICATIONS

Matt Cantor, "About the House: The Truth About Seismic Gas Shut-Off Valves," The Berkeley Daily Plant—The East Bay's Independent Newspaper, Oct. 13, 2006; www.berkeleydailyplanet.com/issue/2006-10-13/article/25313.

* cited by examiner

*Primary Examiner* — Justine Yu
*Assistant Examiner* — Douglas Sul

(57) ABSTRACT

An overpressure protection system and method for a hyperbaric chamber having a secondary relief valve in pressure communication with a hyperbaric chamber and configured to actuate upon occurrence of a predetermined pressure condition. Actuation of the secondary relief valve causes an output signal to be delivered to a relay input, which results in actuation of an emergency vent valve to close an oxygen shutoff valve to terminate the flow of oxygen to the chamber. In the preferred embodiment, the predetermined pressure condition occurs when the chamber pressure exceeds the maximum chamber set point plus a predetermined pressure differential. In the preferred embodiment, the relay may be pneumatic or electromechanical.

22 Claims, 1 Drawing Sheet

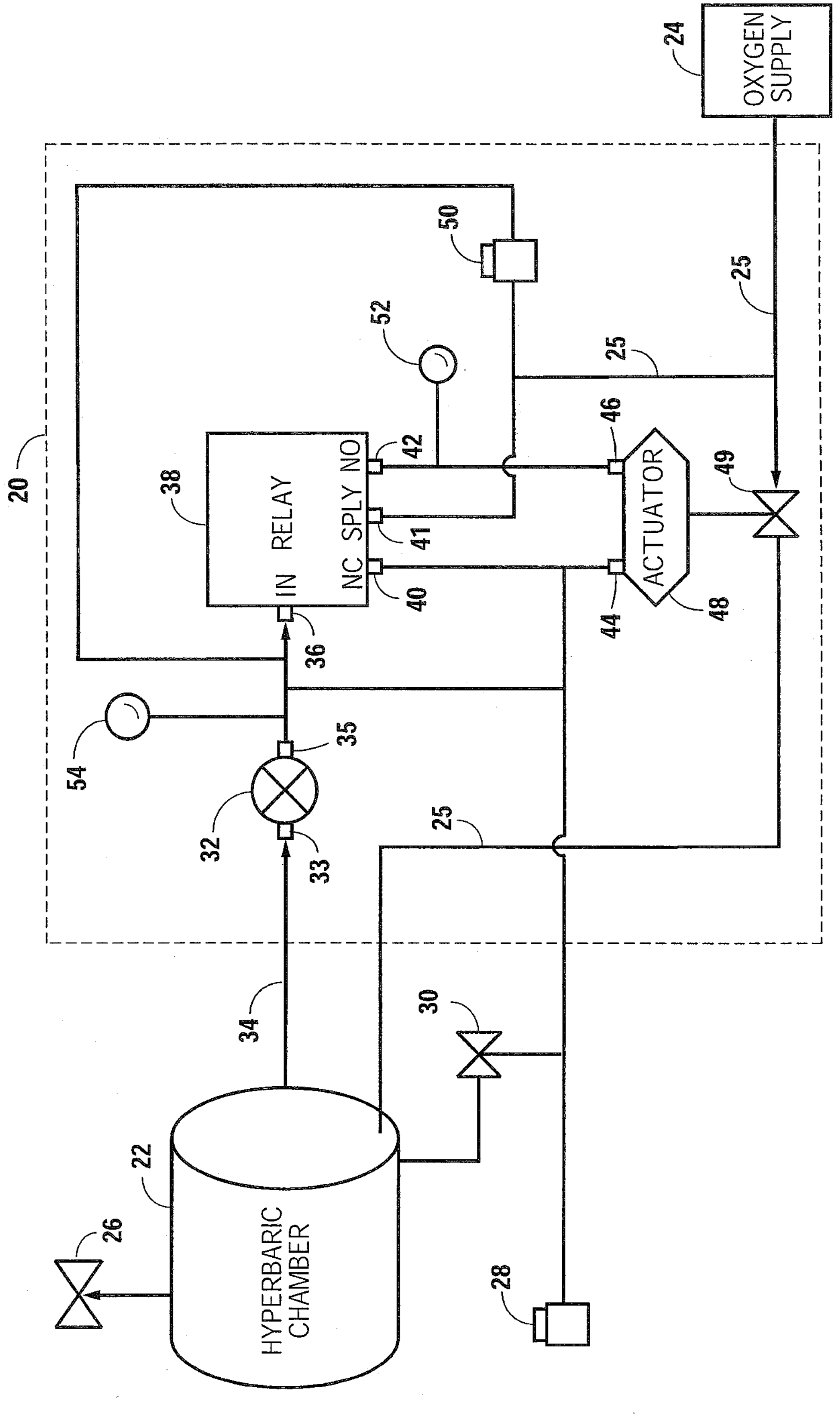
OXYGEN SUPPLY
RELAY
IN
NC
SPLY
NO
ACTUATOR
HYPERBARIC CHAMBER
20
22
24
25
26
28
30
32
33
34
35
36
38
40
41
42
44
46
48
49
50
52
54

OVERPRESSURE PROTECTION SYSTEM AND METHOD FOR A HYPERBARIC CHAMBER

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to a safety system and method for use with hyperbaric chambers. More specifically, the invention is an overpressure protection system and method for interposition between a hyperbaric chamber and a corresponding oxygen supply that both vents the chamber and shuts off oxygen flow upon the occurrence of a predetermined pressure condition. An improved hyperbaric chamber incorporating an overpressure protection system is also provided.

2. Description of the Related Art

Hyperbaric chambers are used in diving to help alleviate symptoms of decompression sickness as well as in the treatment of wounds and disease. During use, the patient sits or lays inside the hyperbaric chamber, typically on a mattress in the supine position, whereafter the hyperbaric chamber is sealed and pressurized to approximately thirty pounds per square inch (psi) using pure oxygen. Increasing pure oxygen pressure within the chamber to this level assists the body in recovering from wounds by increasing the amount of oxygen available to the cells and bloodstream.

When dealing with a pure oxygen environment, there are several significant risks. For example, pure oxygen supports combustion, and any spark or unintentional open flame could lead to an explosion. Also, if the recommended pressure is exceeded within the hyperbaric chamber, the chamber might structurally fail, which can cause the chamber to blow apart at high speed with an additional risk of injury to those in the room or the patient in the chamber.

To address these problems, hyperbaric chambers are typically fixed with overpressure relief valves set for a predetermined pressure, which is typically approximately thirty-five psi. In other words, should the pressure within the hyperbaric chamber reach the predetermined pressure, excess gas is vacated from the chamber through the relief valve.

In addition, regulations typically require two additional shutoff valves between the chamber and the oxygen supply, one of which is typically located inside the room proximal to the chamber, and the other of which is located just outside the room. Typically, these are manual ball valves that can be used to terminate the flow of oxygen from the supply.

Hyperbaric chambers are also required to be equipped with an emergency ventilation system that allows the operator to rapidly decompress the chamber. This system operates at pressures below the point of activation of the chamber overpressure relief valves. In some chamber designs, if the supply gas to the chamber is interrupted, function of the emergency ventilation mechanism may be compromised because the emergency ventilation system requires a gas supply to operate.

Although hyperbaric chambers as they exist today are relatively safe, there are instances where patients and others have been injured or killed as a result of the failures of the existing safety systems. For example, in one incident, a fire initiated by an ignition source introduced by the patient caused fatal burns to the patient. Because the oxygen supply was not cut off, and due to the ongoing fire, the pressure within the hyperbaric chamber increased to >120 psi. The chamber exploded, and parts of the chamber impacted the patient's wife at a high rate of speed, resulting in her death.

BRIEF SUMMARY OF THE INVENTION

The present invention aims to address such concerns by, in the event of a fire, or other situation resulting in an overpressure condition in the chamber, simultaneously (or nearly simultaneously) actuating the chamber's emergency vent valve and terminating oxygen flow. The invention is a system connectable between a hyperbaric chamber and its corresponding oxygen supply that, upon over-pressurization of the chamber, shuts off the oxygen supply to the chamber and simultaneously activates the chamber's emergency ventilation system. Specifically, the present invention eliminates the need for the operator to close supply valves and actuate the emergency ventilation shut off.

The preferred embodiment of the present invention comprises a secondary relief valve having an input and an output. The input is in pressure communication with the hyperbaric chamber, and the relief valve is configured to actuate upon occurrence of a predetermined pressure condition. The output of the secondary relief valve is in communication with a relay having two outputs connected to a valve actuator. In turn, the valve actuator actuates a valve interposed between the hyperbaric chamber and the oxygen supply to shut off the flow of oxygen.

While the preferred embodiment of the present invention is designed to be used with existing hyperbaric chambers with emergency ventilation systems, alternative embodiments contemplate replacement of existing emergency ventilation systems with the present invention. In addition, while the preferred embodiment is described with reference to a pneumatic relay, in alternative embodiments electromechanical relays are used. In such case, the outputs and inputs of the connected components are electrical rather than pneumatic, as will be understood by one having ordinary skill in the art. For example, the secondary relief valve would generate an electrical rather than pneumatic output to the relay, and the outputs of the relay would provide electrical, rather than pressure, outputs.

The following patents and published applications are incorporated by reference herein: U.S. Pat. No. 3,368,556; U.S. Pat. No. 3,547,118; U.S. Pat. No. 4,633,859; U.S. Pat. No. 5,503,143; U.S. Pat. No. 6,050,132; U.S. Pat. No. 7,360,539; U.S. Published App. 2004/0261796; U.S. Published App. 2008/0178877; and U.S. Published App. 2009/0014004.

BRIEF DESCRIPTION OF THE SEVERAL VIEWS OF THE DRAWINGS

FIG. 1 is a block diagram of the preferred embodiment of the system of the present invention.

DETAILED DESCRIPTION OF THE INVENTION

FIG. 1 is a system diagram of a preferred embodiment of an overpressure protection system 20 having the features of the present invention and interposed between a hyperbaric chamber 22 and an oxygen supply 24. The chamber 22 receives oxygen from a supply line 25 connected to the oxygen supply 24, and is set to operate at a maximum chamber set point to result in a predetermined absolute pressure, which is typically three atmospheres absolute.

During normal operation, the chamber 22 receives oxygen from the oxygen supply 24 through the supply line 25. The chamber 22 include a chamber relief valve 26 typically configured to open at a predetermined relief valve pressure to prevent overpressurization. Alternatively, in the event an operator detects an overpressure condition or otherwise needs to quickly remove a patient from the chamber 22, depressing an emergency actuation button 28 actuates emergency vent valve 30 to cause the pressure within the chamber 22 to vent. In addition, at least one shutoff valve (not shown) is typically located within and/or near the treatment area to allow the operator to prevent the flow of oxygen into the chamber 22 through the supply line 25.

The system 20 comprises a secondary relief valve 32 having an input 33 in pressure communication with the chamber 22 through a pressure line 34. The secondary relief valve 32 is set to actuate (e.g., open) on the occurrence of a predetermined pressure condition within the chamber 22. In this embodiment, the predetermined pressure condition occurs when pressure within the chamber 22 is at least a first pressure differential above the maximum chamber set point but at a pressure lower than the chamber relief valve 26. More specifically, in this embodiment, the first pressure differential is two psi above the maximum chamber set point. In alternative embodiments, the predetermined pressure condition is the occurrence of the rate of pressure change within the chamber 22 exceeding a predetermined threshold (for example, pressure within the chamber 22 is increasing at five psig/min or more) or some combination of the rate of pressure change with the pressure.

An output 35 of the secondary relief valve 32 is connected to the input 36 of a pneumatic relay 38. The relay 38 has a normally-closed output 40 and a normally-open output 42 connected to a closed output 44 and an open output 46, respectively, of a valve actuator 48. A ball shutoff valve 49 is actuatable by the actuator 48 and interposed in the supply line 25 to selectively permit or inhibit flow of oxygen from the oxygen supply 24 to the chamber 22. In alternative embodiments, a second, manually-operated ball valve (not shown) is interposed in the supply line 25 between the oxygen supply 24, and the shutoff valve 49.

A manual actuator 50 is provided and connected to the input 36 to allow the operator to directly actuate the system 20. First and second pneumatic indicators 52, 54 are connected to the normally-open output 42 and secondary relief valve 32, respectively, to provide visual confirmation of system state—that is, oxygen flow from the supply line 25 into the relay 38 actuates the first indicator 52 to indicate a "ready" status, and oxygen flow through the secondary relief valve 32 actuates the second indicator 54 to indicated an "activated" status.

In the "ready" state, oxygen from the supply line 25 passes into the pneumatic relay 38 through the supply port 41 and is directed through the normally-open output 42 to the "open" port 46 of the actuator 48. This causes the ball valve 49 to open, which allows oxygen to pass from the supply 24 to the hyperbaric chamber 22.

If and when the chamber pressure exceeds the set point of the secondary relief valve 32, or if the operator actuates the manual actuator 50, the relay 38 closes the normally-open output 42 and opens the normally-closed output 40, which directs oxygen received into the relay 38 to the close port 44 of the actuator 48. This closes the ball valve 49 to shut off flow to the chamber 22. Simultaneously, oxygen flow is directed to the input of the emergency vent valve 30 in a feedback loop causing actuation thereof, and to the input 36 of the relay 38 assuring that ball valve 49 remains closed by keeping the relay 38 in an actuated state.

The system 20 remains active until it is reset by removing and reapplying power.

The present invention is described above in terms of a preferred illustrative embodiment of a specifically described system. Those skilled in the art will recognize that alternative constructions of such a system can be used in carrying out the present invention. Other aspects, features, and advantages of the present invention may be obtained from a study of this disclosure and the drawings, along with the appended claims.

I claim:

1. An overpressure protection system for use with a hyperbaric chamber, the system comprising:

an oxygen supply;

a secondary relief valve having an input and an output, wherein said input is in pressure communication with a hyperbaric chamber connected to an emergency vent valve, and wherein said secondary relief valve is configured to actuate upon occurrence of a predetermined pressure condition;

a relay having an input in communication with said secondary relief valve output, a supply port in fluid communication with said oxygen supply, a normally-open output, and a normally-closed output in communication with said emergency vent valve;

a valve actuator connected to said normally-open output and said normally-closed output;

a shutoff valve interposed between said hyperbaric chamber and said oxygen supply, wherein said shutoff valve is actuatable with said valve actuator; and wherein said hyperbaric chamber has a chamber pressure, maximum chamber set point, and is connected to a chamber relief valve having a relief valve set point.

2. The system of claim 1 wherein said normally-closed output is in communication with said relay input.

3. The system of claim 1 further comprising a manual actuator having an input in fluid communication with the oxygen supply and an output connected to said relay input.

4. The system of claim 1 further comprising a first indicator connected to said normally-open output.

5. The system of claim 1 further comprising a second indicator connected to said secondary relief valve output.

6. The system of claim 1 wherein said relay is a pneumatic relay.

7. The system of claim 1 wherein said relay is an electromechanical relay.

8. The system of claim 1 wherein said predetermined pressure condition is said chamber pressure being equal to or greater than at least a first pressure differential above said maximum chamber set point and below the relief valve set point.

9. The system of claim 8 wherein said first pressure differential is two psi.

10. The system of claim 1 wherein said first pressure condition is a predetermined rate of change of said chamber pressure.

11. A method of eliminating an overpressure condition in a hyperbaric chamber, the method comprising the steps of:

interposing a shutoff valve actuatable by a relay between a hyperbaric chamber and an oxygen supply, wherein said hyperbaric chamber is adapted to receive oxygen from an oxygen supply and is connected to an emergency vent valve;

providing a relay having an input a supply port in fluid communication with the oxygen supply, and at least one output connected to said shutoff valve through a valve actuator and said emergency vent valve;

monitoring the pressure within said hyperbaric chamber for the occurrence of a predetermined pressure condition;

closing said shutoff valve upon the occurrence of said first predetermined pressure condition;

actuating said emergency vent valve upon the occurrence of said predetermined pressure condition;

providing a feedback signal from said at least one output to said input; and wherein said hyperbaric chamber has a chamber pressure, a maximum chamber set point and is connected to a chamber relief valve having a relief valve set point.

12. The method of claim 11 wherein said relay is a pneumatic relay.

13. The method of claim 11 wherein said relay is an electromechanical relay.

14. The method of claim 11 wherein said predetermined pressure condition is the chamber pressure being equal to or greater than at least a first pressure differential above said maximum chamber set point and below said relief valve set point.

15. The method of claim 14 wherein said first pressure differential is two psi.

16. The method of claim 11 wherein said first pressure condition is a predetermined rate of change of said chamber pressure.

17. An improved hyperbaric chamber that is adapted to receive oxygen from an oxygen supply, the hyperbaric chamber having a pressure vessel, a maximum chamber set point, a chamber relief valve having a relief valve set point, and an emergency vent valve, the improvements comprising:

a secondary relief valve having an input and an output, wherein said input is in pressure communication with the pressure vessel, and wherein said relief valve is configured to actuate upon occurrence of a predetermined pressure condition;

a relay having an input in communication with said secondary relief valve output, a supply port in fluid communication with the oxygen supply, a normally-open output, and a normally-closed output in communication with said emergency vent valve;

a valve actuator connected to said normally-open output and said normally-closed output; and a shutoff valve interposed between the pressure vessel and the oxygen supply, wherein said shutoff valve is actuatable with said valve actuator.

18. The chamber of claim 17 wherein said relay is a pneumatic relay.

19. The chamber of claim 17 wherein said relay is an electromechanical relay.

20. The chamber of claim 17 wherein said predetermined pressure condition is the chamber pressure being equal to or greater than at least a first pressure differential above said maximum chamber set point and below the relief valve set point.

21. The chamber of claim 20 wherein said first pressure differential is two psi.

22. The chamber of claim 17 wherein said first pressure condition is a predetermined rate of change of the chamber pressure.

* * * * *